US007720710B2

(12) United States Patent
Morrison

(10) Patent No.: US 7,720,710 B2
(45) Date of Patent: May 18, 2010

(54) SELF-SERVICE SYSTEM AND METHOD INCLUDING SHARED COMPONENTS

(75) Inventor: James Morrison, Suwanee, GA (US)

(73) Assignee: NCR Corporation, Duluth, GA (US)

(*) Notice: Subject to any disclaimer, the term of this patent is extended or adjusted under 35 U.S.C. 154(b) by 1171 days.

(21) Appl. No.: 11/173,750

(22) Filed: Jul. 1, 2005

(65) Prior Publication Data
US 2007/0016481 A1 Jan. 18, 2007

(51) Int. Cl.
*G06Q 20/00* (2006.01)
*A63F 9/02* (2006.01)
(52) U.S. Cl. .......................... 705/16; 186/61; 235/383
(58) Field of Classification Search .................. 186/61; 177/50; 235/383
See application file for complete search history.

(56) References Cited
U.S. PATENT DOCUMENTS
4,676,343 A * 6/1987 Humble et al. ............. 186/61
5,115,888 A * 5/1992 Schneider .................. 186/61

* cited by examiner

*Primary Examiner*—F. Ryan Zeender
*Assistant Examiner*—Denisse Ortiz Roman

(57) ABSTRACT

A self-service system and method which uses shared components. The self-service checkout system includes a checkout platform including a plurality of checkout stations arranged together and associated with a plurality of checkout lanes, and checkout components including unshared components at each of the checkout stations and shared components available for use by customers at any of the checkout stations, and a computer for receiving indications of starts of overlapping transactions at two or more of the plurality of checkout stations, for establishing transaction records for the transactions, for determining that one of the checkout components must be used at a point in one of the transactions, for interrupting the one transaction, for determining that the one checkout component is a shared component, for determining that the one checkout component is in use by another of the transactions, and for resuming the one transaction after the one checkout component is no longer being used by the other transaction.

21 Claims, 5 Drawing Sheets

US 7,720,710 B2

SELF-SERVICE SYSTEM AND METHOD INCLUDING SHARED COMPONENTS

BACKGROUND

Self-service systems contain a necessary set of peripherals, like printers, cash acceptors, and cash dispensers. Some of these peripherals are costly. Some of these peripherals have a large size. In order to be competitive, some manufacturers must limit features and functions.

Therefore, it would be desirable to provide a self-service system and method which offers full functionality at a lower cost and in a smaller package.

SUMMARY

A self-service system and method including shared components is provided.

The self-service checkout system includes a checkout platform including a plurality of checkout stations arranged together and associated with a plurality of checkout lanes, and checkout components including unshared components at each of the checkout stations and shared components available for use by customers at any of the checkout stations, and a computer for receiving indications of starts of overlapping transactions at two or more of the plurality of checkout stations, for establishing transaction records for the transactions, for determining that one of the checkout components must be used at a point in one of the transactions, for interrupting the one transaction, for determining that the one checkout component is a shared component, for determining that the one checkout component is in use by another of the transactions, and for resuming the one transaction after the one checkout component is no longer being used by the other transaction.

DETAILED DESCRIPTION

Figure 1:
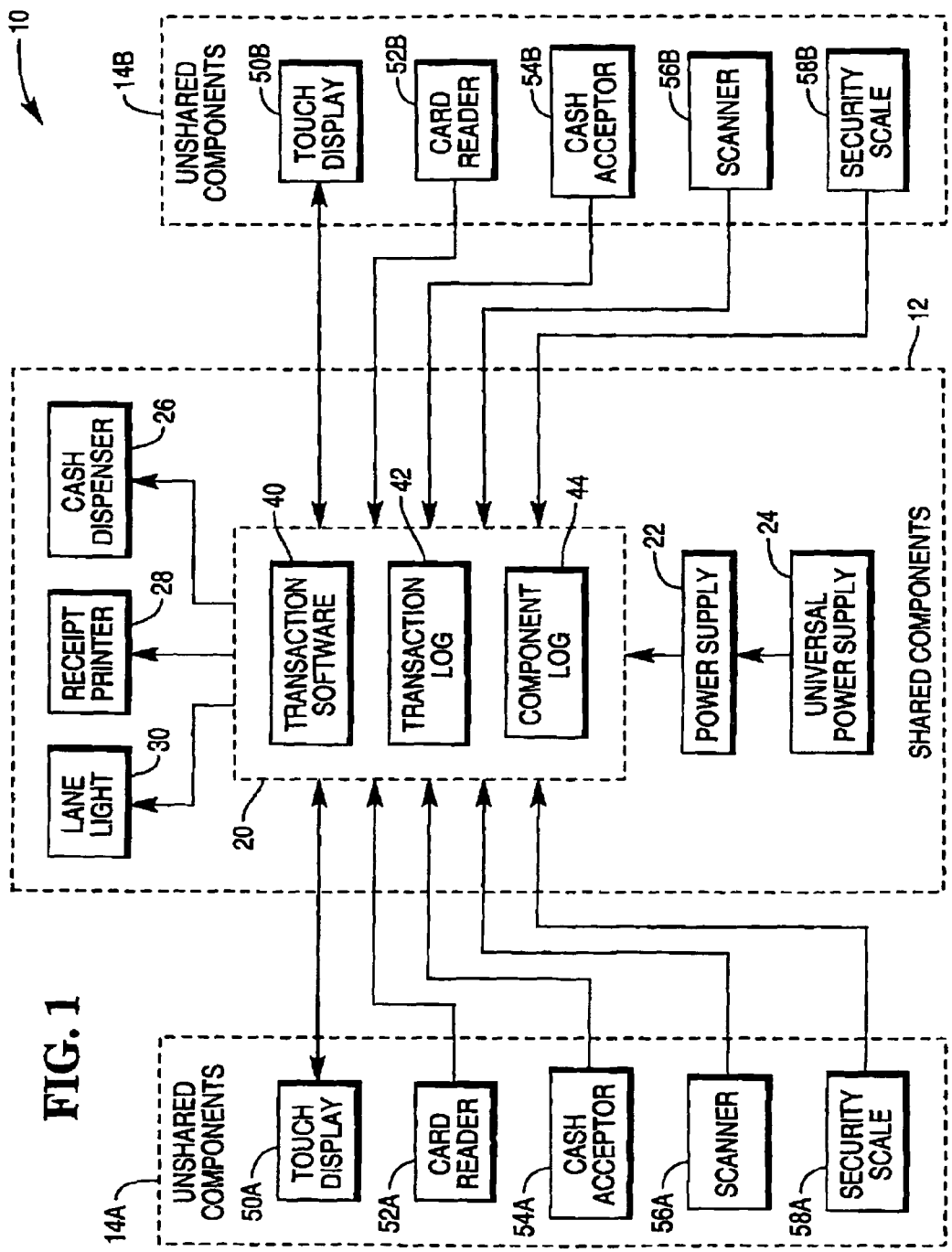
FIG. 1 is a block diagram of an example self-service system.

With reference to FIG. 1, an example self-service system includes self-service checkout system 10. Other types of self-service systems are also envisioned, including kiosks and automated teller machines.

Self-service checkout system 10 includes shared components 12 and unshared components 14A and 14B. Shared components 12 may include components that are capable of being shared without a significant negative effect on a transaction, compared to self-service checkout systems that don't use sharing. For example, if sharing a component causes additional significant delay, then the component may not qualify for sharing. Another example, if the component requires the user to input something it may not qualify for sharing. The best components for sharing would be those that require the user to remove something or have no input to. High cost components, like computer 20 and cash dispenser 26, may be the first components to be considered for sharing.

Shared components 12 may include computer 20, power supply 22, universal power supply 24, cash dispenser 26, receipt printer 28, and lane light 30.

Computer 20 controls operation of self-service checkout system 10. Computer 20 executes transaction software 40, which records items for purchase, implements security functions, and processes payment.

Transaction software 40 also sequences operation of some of unshared components 14A and 14B to avoid conflicts between overlapping customer transactions. For example, transaction software 40 minimizes the possibility that cash intended for delivery to one customer is not delivered to another customer. As another example, transaction software 40 minimizes the possibility that a receipt intended for one customer is not delivered to another customer.

Transaction software 40 tracks component status information, shared or unshared, in component log 44. Each component registers a unique identifier with transaction software 40. Transaction software 40 associates component identifiers with status information and side.

Transaction software 40 keeps track of requests for shared components 12 in transaction log 42.

Power supply 22 provides power to computer 20, unshared components 14A and 14B, and shared components 12, including cash dispenser 26, receipt printer 28, and lane light 30.

Universal power supply 24 regulates power to power supply 22 and provides backup power in case of a primary power failure.

Cash dispenser 26 dispenses cash.

Receipt printer 28 prints and dispenses a receipt.

Lane light 30 identifies self-service checkout system 10 as being open or closed.

Unshared components 14A and 14B may include touch displays 50A and 50B, card readers with personal identification number (PIN) pads 52A and 52B, cash acceptors 54A and 54B, scanners with scales 56A and 56B, and security scales 58A and 58B.

Touch displays 50A and 50B display transaction information and send customer selections to the transaction software 40.

Card readers 52A and 52B record customer payment via credit or debit card.

Scanners 54A and 54B scan bar code labels on items.

Security scales 56A and 56B record weights of purchased items to help computer determine whether a customer is acting improperly. For example, security scales 56A and 56B may include scales under set aside shelves or bag wells.

Personal identification number (PIN) pads 58A and 58B record customer PINs.

Other example configurations of shared components 12 and unshared components 14A and 14B are also envisioned, including configurations with additional components not named herein or fewer components, as determined by retailer need. For example, self-service checkout system 10 may include a produce scale or a scanner with a built-in produce scale. Card readers 52A and 52B may be part of PIN pads 58A and 58B. Self-service checkout system 10 may include one or more cash acceptors for accepting cash payment from customers, and one or more signature capture pads for recording customer signatures.

Figure 2:
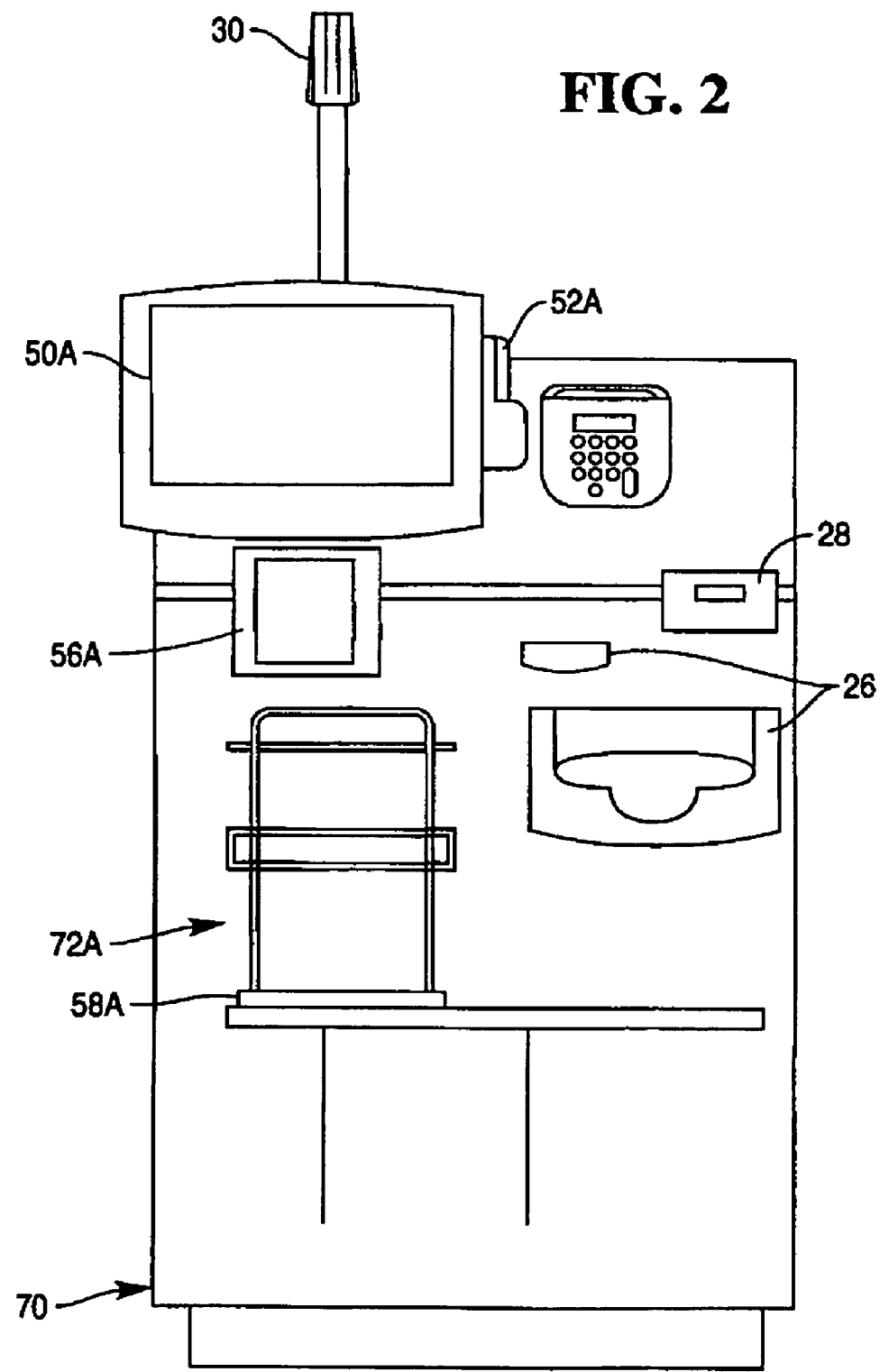
FIG. 2 is a side view of the example self-service system.
Figure 3:
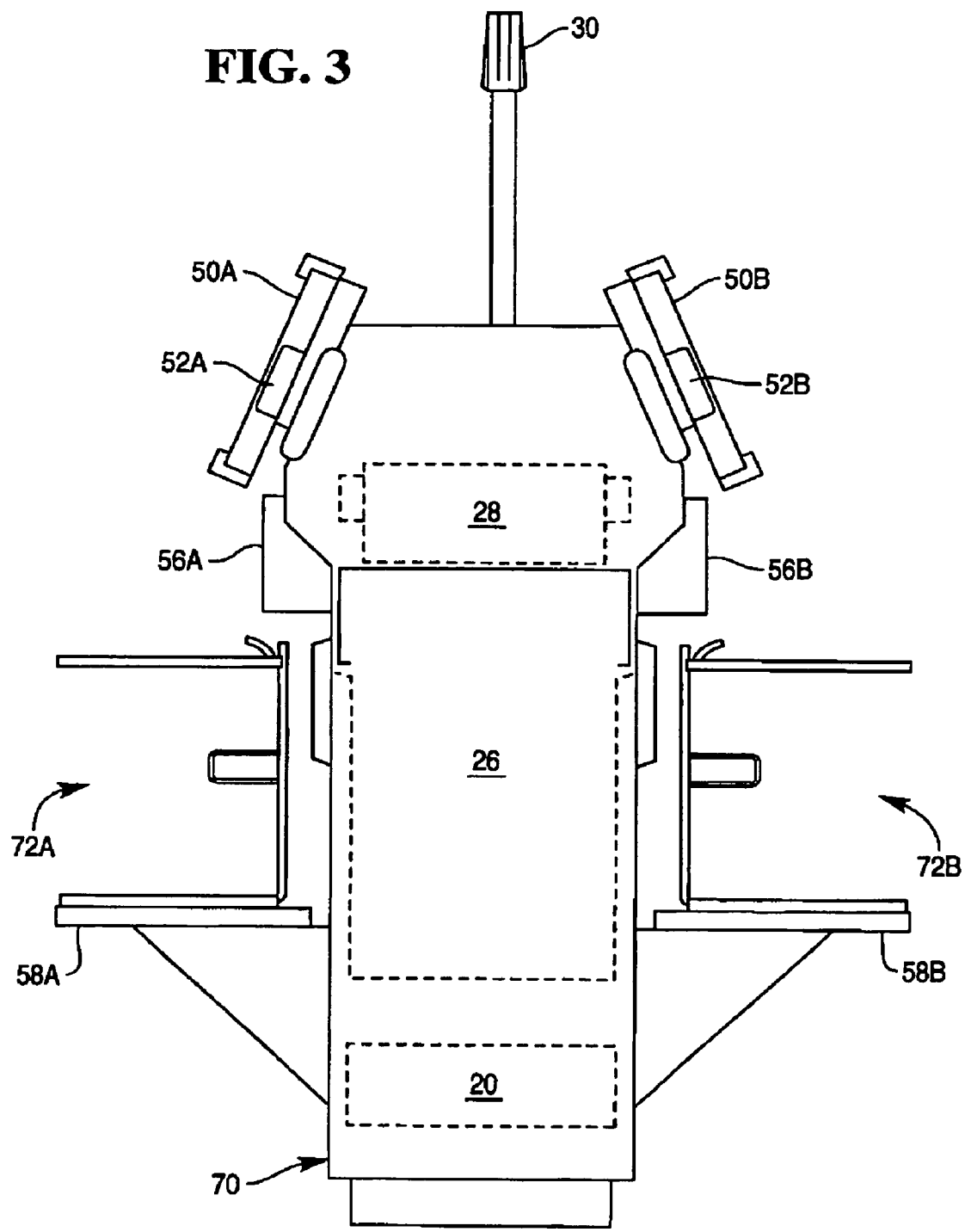
FIG. 3 is an end view of the example self-service system.

With reference to FIGS. 2 and 3, an example layout of self-service checkout station 10 is illustrated.

Shared components 12 and unshared components 14A and 14B share a common platform 70, with unshared components 14A and 14W also including bag stands 72A and 72B, respectively, being located on opposite sides of platform 70 to facilitate two customer stations. Platform 70 contains shared components 12, which are accessible to both sides. An alternate embodiment may include additional stations around platform 70 with additional sets of unshared components 14.

Figure 4A:
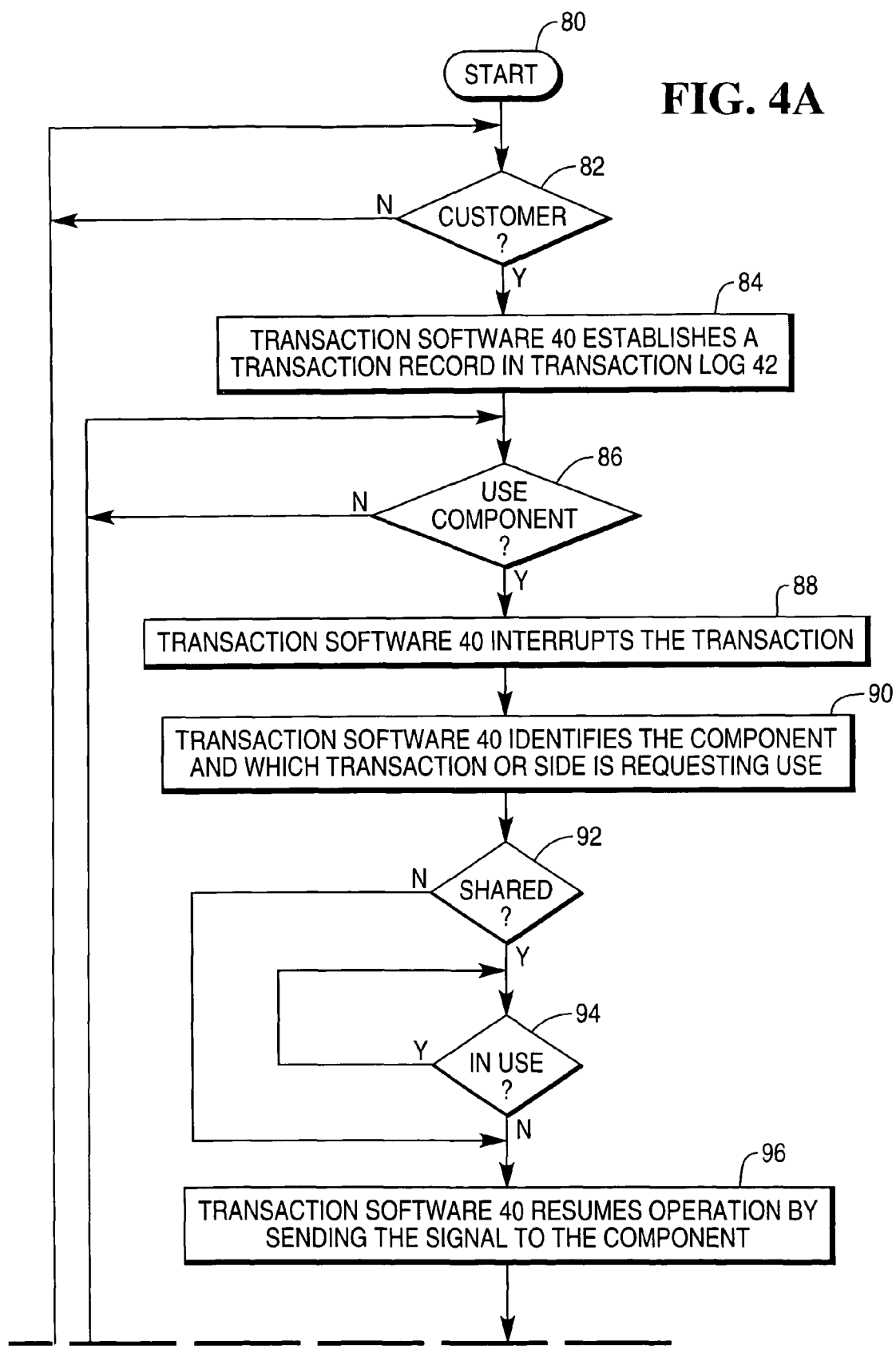
FIGS. 4A and 4B are a flow diagram illustrating operation of the example self-service system.
Figure 4B:
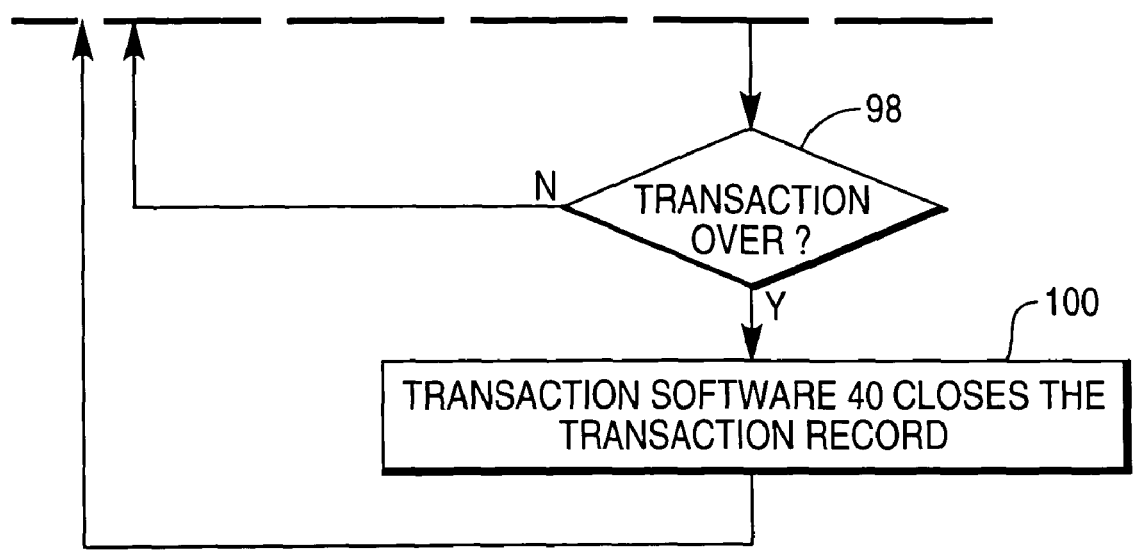

With reference to FIG. 4, an example operation of transaction software 40 is illustrated in detail beginning with START 80.

In step 82, transaction software 40 waits for a customer to use self-service checkout system. The start of a transaction may be indicated by a customer action, such as selecting a choice of language on touch display 50A or 50B. Also, transaction software 40 may already be processing a transaction of another customer at a checkout station on a different platform side. Operation continues to step 84.

In step 84, transaction software 40 establishes a transaction record in transaction log 42, so as to keep transactions on opposite sides separate.

In step 86, transaction software 40 continues operation until it reaches a point at which it must send a signal to a component.

In step 88, transaction software 40 interrupts the transaction.

In step 90, transaction software 40 identifies the component, informs the component driver to activate, and which transaction or side is requesting use. Transaction software 40 knows the unique identifier associated with each initiating device. Therefore, transaction software 40 knows on which side the transaction was initiated.

In step 92, transaction software 40 determines whether the component is a shared component 12 or unshared component 14. If the component is an unshared component 14, operation proceeds to step 96. Otherwise, operation proceeds to step 94.

In step 94, transaction software 40 determines whether the shared component 12 is in use. For example, transaction software 40 may set a timeout period following an earlier signal to operating the shared component 12 and not allow subsequent access to the shared component 12 until the timeout period has expired. As another example, transaction software 40 may receive component busy and component ready signal from the shared component 12, if shared component 12 is capable of bi-directional communication with computer 20. As another example, if shared component 12 is not capable of bi-directional communication, shared component 12 may have a common divert gate which will have a home position and a secondary position. By detecting which position the divert gate is in, transaction software 40 can determine whether to continue with that shared component 12 or request repositioning of the divert gate. If the shared component is in use, transaction software 20 waits for the share component 12 to become available and then moves the divert gate. Otherwise, operation proceeds to step 96.

In step 96, transaction software 40 resumes operation by sending the signal to the component.

In step 98, transaction software 40 determines whether the transaction is over. For example, transaction software 40 may send a signal to receipt printer 28 to print a receipt and receive a return signal following successful printing. As another example, transaction software 40 may send a signal to a signature capture pad, if self-service checkout system 10 is so equipped, to display a signature line and "done" symbol, and then receive a return signal following recording customer touching of the done symbol with a stylus. If the transaction is over, operation proceeds to step 100. If not, operation returns to step 86 and continues until transaction software 40 must send a signal to another component.

In step 100, transaction software 40 closes the transaction record. Operation returns to step 82 to await the next customer.

Although particular reference has been made to certain embodiments, variations and modifications are also envisioned within the spirit and scope of the following claims.

The invention claimed is:

1. A self-service checkout system comprising:
    a common checkout platform shared by
        at least two checkout stations arranged on opposite sides of the common checkout platform each checkout station associated with a checkout lane; and
        checkout components including unshared components at each of the checkout stations and a shared component available for use by customers at more than one of the checkout stations, the unshared components comprising a touch display and a bar code scanner and the shared component comprising a cash dispenser; and
    a computer for monitoring transactions being carried out at the at least two checkout stations, the computer being operative to identify that the shared component is required in a first transaction being carried out at a first checkout station, to determine if the shared component is already in use in connection with another transaction at a second checkout station and to interrupt the first transaction until the shared component is available; and
    wherein the computer receives a component busy signal from the shared checkout component and does not resume the first transaction until the computer receives a component ready signal from the shared checkout component.

2. The system of claim 1 further comprising a further share component, wherein the further shared component comprises a receipt printer having a receipt delivery slot accessible to customers at the at least two checkout stations.

3. The system of claim 1, wherein the cash dispenser has a cash delivery slot accessible to a customer of the first checkout station when the computer receives the component ready signal.

4. The system of claim 1 further comprising a further share component, wherein the further shared component comprises a lane light controlled by the computer for indicating operating status of the at least two checkout stations.

5. The system of claim 1 further comprising a further shared component, wherein the further shared component comprises a power supply for providing power to the at least two checkout stations.

6. The system of claim 1, wherein the computer employs transaction software to track requests for the shared component in a transaction log.

7. A self-service checkout system comprising:
    a common checkout platform shared by
        a first checkout station and a second checkout station arranged together and associated with first and second checkout lanes; and
        checkout components including unshared components comprising a touch screen display and a security scale at each of the checkout stations and shared components comprising a cash dispenser available for use by customers at both of the checkout stations;
    a computer for monitoring transactions being carried out at both the first and second checkout stations, the computer being operative to interrupt a first transaction when use of a component is required, to determine whether the component to be used is a shared component already in use in connection with a second transaction being conducted at the second checkout station, to not resume the first transaction upon determining that the component to be used is a shared component and, through receipt of a component busy signal from the component to be used, that the component to be used is in use in connection with the second transaction being conducted at the second checkout station, until the computer receives a component ready signal from the shared checkout component, and to resume the first transaction upon determining that the component to be used is not a shared component in use in connection with the second transaction being conducted at the second checkout station.

8. The system of claim 7, wherein the shared further components further comprise a receipt printer having a receipt delivery slot accessible to customers at the first and second checkout stations.

9. The system of claim 7, wherein the cash dispenser has a cash delivery slot accessible to customers at the first and second checkout stations.

10. The system of claim 7, wherein the unshared components further include a card reader.

11. The system of claim 7, wherein the unshared components further include a personal identification number entry keypad.

12. The system of claim 7, wherein the unshared components further include a cash acceptor.

13. The system of claim 7, wherein the unshared components further include a barcode scanner.

14. The system of claim 7, wherein the unshared components further include a produce scale.

15. A self-service checkout system comprising:
   a common checkout platform shared by
      first and second checkout stations arranged together and associated with two checkout lanes, each of the two checkout stations including unshared components including
         a touch display;
         a card reader;
         a personal identification number entry keypad;
         a cash acceptor;
         a barcode scanner;
         a produce scale;
         a security scale; and
      shared components available for use by customers at any of the two checkout stations including
         a cash dispenser having a cash delivery slot accessible to customers at the two checkout stations; and
         a receipt printer having a receipt delivery slot accessible to customers at the two checkout stations; and
   a computer for monitoring transactions being carried out at the first and second checkout stations, the computer being operative to identify a shared component required in a first transaction being carried out at the first checkout station, to determine if the shared component is in use in connection with a second transaction at the second checkout station through receipt of a component busy signal from the shared component, and to interrupt the first transaction until the shared component is available through receipt of a component ready signal from the shared component.

16. A self-service checkout method comprising:
   a) monitoring transactions being carried out at each of a plurality of common checkout platforms by a computer, each of the transactions involving use of unshared components at the checkout platform at which the transaction is being conducted, and shared components used at different times by at least a first and a second transaction;
   b) interrupting the first transaction by the computer upon detecting that initiation of use of a shared component is required to continue the first transaction;
   c) determining if the shared component is in use in connection with the second transaction by the computer including determining if a component busy signal from the shared component was received by the computer;
   d) determining if the shared component is not in use by the second transaction by the computer including determining if a component ready signal from the shared component was received by the computer; and
   e) allowing resumption of the first transaction by the computer if the shared component is not in use by the second transaction.

17. The method of claim 16, wherein the component comprises a receipt printer having a receipt delivery slot accessible to customers at the plurality of checkout stations.

18. The method of claim 16, wherein the component comprises a cash dispenser having a cash delivery slot accessible to customers at the plurality of checkout stations.

19. A self-service checkout system comprising:
   a common checkout platform shared by
      at least two checkout stations arranged on opposite sides of the common checkout platform each checkout station associated with a checkout lane; and
      checkout components including unshared components at each of the checkout stations and a shared component available for use by customers at more than one of the checkout stations, the unshared components comprising a touch display and a bar code scanner and the shared component comprising a cash dispenser;
   a computer for monitoring transactions being carried out at the at least two checkout stations, the computer being operative to identify that the shared component is required in a first transaction being carried out at a first checkout station, to determine if the shared component is already in use in connection with another transaction at a second checkout station and to interrupt the first transaction until the shared component is available; and
   a direct gate controlling access to the shared component, wherein the computer determines that the divert gate controlling access to the shared checkout component is in a component unavailable position and, when the shared checkout component becomes available, sends a request to the shared checkout component to reposition the divert gate to a component available position.

20. The system of claim 19, wherein the cash dispenser has a cash delivery slot accessible to a customer of the first checkout station when the direct gate is in the component available position.

21. A self-service checkout method comprising:
   a) monitoring transactions being carried out at each of a plurality of common checkout platforms by a computer, each of the transactions involving use of unshared components at the checkout platform at which the transaction is being conducted, and shared components used at different times by at least a first and a second transaction;
   b) interrupting the first transaction by the computer upon detecting that initiation of use of a shared component is required to continue the first transaction;
   c) determining if the shared component is in use in connection with the second transaction by the computer including determining if a divert gate of the shared component is in a component unavailable position;
   d) sending a request to the shared component to reposition the divert gate to a component available position by the computer if the divert gate of the shared component is in a component unavailable position;

e) determining if the shared component is not in use by the second transaction by the computer including determining if the divert gate of the shared component is in the component available position; and f) resuming the first transaction by the computer if the divert gate of the shared component is in the component available position.

* * * * *